US012623310B2

(12) United States Patent (10) Patent No.: US 12,623,310 B2
Courapied et al. (45) Date of Patent: May 12, 2026

(54) LASER HEATING FOR THE MANUFACTURE OR REPAIR OF A TURBINE BLADE

(71) Applicant: SAFRAN, Paris (FR)

(72) Inventors: Damien Jonathan Julien Courapied, Moissy-Cramayel (FR); Guillaume Valentin Giamondo Marion, Moissy-Cramayel (FR)

(73) Assignee: SAFRAN, Paris (FR)

( * ) Notice: Subject to any disclaimer, the term of this patent is extended or adjusted under 35 U.S.C. 154(b) by 277 days.

(21) Appl. No.: 18/002,143

(22) PCT Filed: Jun. 9, 2021

(86) PCT No.: PCT/FR2021/051032
§ 371 (c)(1),
(2) Date: Dec. 16, 2022

(87) PCT Pub. No.: WO2021/255365
PCT Pub. Date: Dec. 23, 2021

(65) Prior Publication Data
US 2023/0302588 A1 Sep. 28, 2023

(30) Foreign Application Priority Data
Jun. 18, 2020 (FR) ...................................... 2006357

(51) Int. Cl.
*B23P 6/00* (2006.01)
*B23K 26/50* (2014.01)
(52) U.S. Cl.
CPC .............. *B23P 6/002* (2013.01); *B23K 26/50* (2015.10)

(58) Field of Classification Search
CPC ....................... B23K 2101/001; B23K 26/067; B23K 26/34; B23K 26/342; B23K 26/50; B23K 26/60; B23P 6/002; B33Y 10/00; B33Y 30/00; B33Y 40/20; F01D 5/005; F01D 5/12; F01D 5/282; F05D 2230/31; F05D 2230/40
(Continued)

(56) References Cited

U.S. PATENT DOCUMENTS

| | | | | |
|---|---|---|---|---|
| 8,124,912 B2 * | 2/2012 | Bayer | .................... | C21D 1/34 |
| | | | | 219/121.76 |
| 2009/0107968 A1 | 4/2009 | Bayer et al. | | |

(Continued)

FOREIGN PATENT DOCUMENTS

EP 1 702 498 A0 9/2006

OTHER PUBLICATIONS

International Search Report mailed on Oct. 5, 2021 in PCT/FR2021/051032 filed on Jun. 9, 2021 (2 pages).

*Primary Examiner* — Sang Y Paik
(74) *Attorney, Agent, or Firm* — Oblon, McClelland, Maier & Neustadt, L.L.P.

(57) ABSTRACT

A device for laser heating of a mechanical part of the turbine blade or turbine blade element type, including: one or more laser emitters, for respectively emitting at least a first laser radiation at a first predetermined power towards a first target area of the part and for emitting a second laser radiation at a second predetermined power towards a second target area of the part, different from the first target area, the second predetermined power being different from the first predetermined power.

9 Claims, 6 Drawing Sheets

(58) Field of Classification Search
USPC .......................................................... 219/221
See application file for complete search history.

(56) References Cited

U.S. PATENT DOCUMENTS

| | | | |
|---|---|---|---|
| 2014/0099476 A1* | 4/2014 | Subramanian ........ | B29C 64/153 |
| | | | 428/164 |
| 2019/0126413 A1 | 5/2019 | Bogdan, Jr. et al. | |
| 2020/0055239 A1* | 2/2020 | Nixon ................... | B33Y 10/00 |
| 2021/0379830 A1* | 12/2021 | Champion ............ | B29C 64/277 |
| 2022/0241867 A1* | 8/2022 | Noble .................... | B22F 12/42 |

* cited by examiner

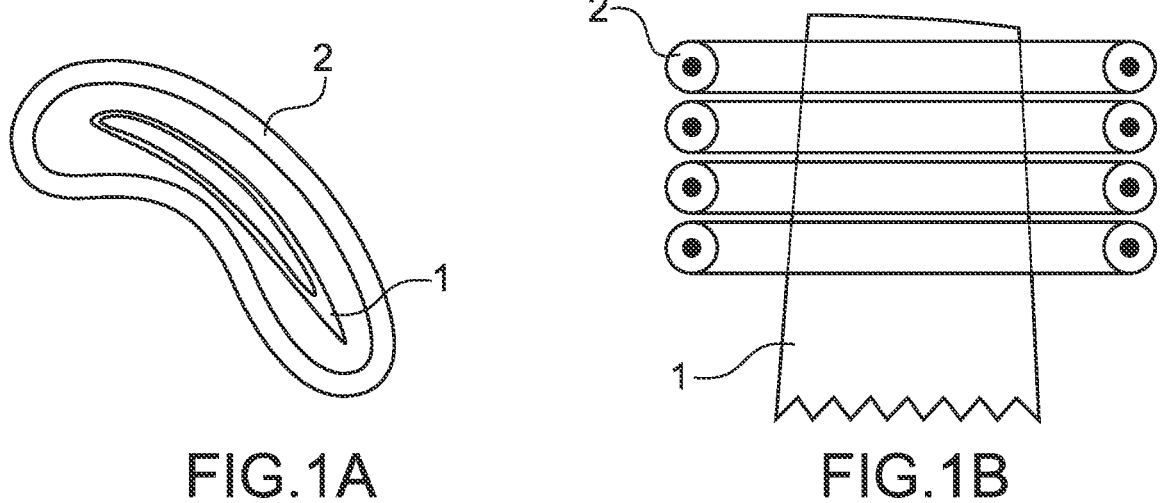
FIG.1A                    FIG.1B
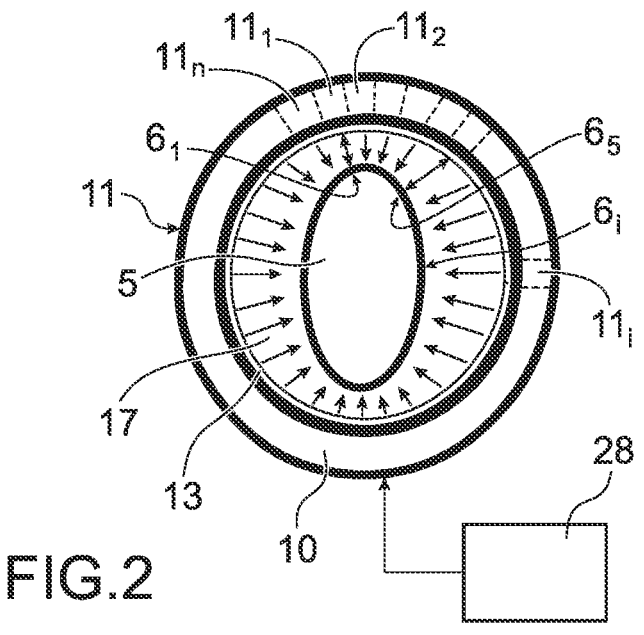
FIG.2

136a $S_i$

35

136b

136c $136_{21}$   $136_{31}$   $136_{37}$

LASER HEATING FOR THE MANUFACTURE OR REPAIR OF A TURBINE BLADE

TECHNICAL FIELD AND PRIOR ART

The present application relates to the field of the manufacture or repair of mechanical parts for which at least one heating step according to an accurate thermal distribution must be carried out. In particular, it applies to making of a part, in particular made of metal and/or of a composite material, with a complex shape and likely to undergo significant thermal and mechanical stresses such as a turbine blade, for example for an aircraft engine.

During the process of manufacturing a blade, it is common practice to subject a blade element to a heat treatment which modifies the characteristics of its material. For example, a so-called "pre-heating" heat treatment may be implemented before a welding operation or before a material addition operation, in order to limit stresses in the material and prevent the apparition of cracks. To perform this kind of step, it is known in particular to use an induction heating device.

An example of an induction heating device is illustrated in FIGS. 1A-1B (respectively giving a cross-sectional view and a longitudinal sectional view) and enables contactless heating of a body 1 in an electromagnetic field produced by a coil 2.

In the illustrated example, the coil 2 has a shape suited to that of the body 1 and replicates its geometry. This allows distributing the heat uniformly.

Such a device has the drawback of being difficult to adapt to heating of elements of different geometry. Moreover, in some cases, a non-uniform yet controlled heat distribution over different areas of the part may be desired.

The problem of implementing a new heating device that is improved with regards to the above-mentioned drawback(s) arises.

DISCLOSURE OF THE INVENTION

An embodiment of the present invention provides for a laser heating device for heating a part or a part element according to a predetermined thermal profile, said heating device comprising: a given laser source provided with one or more laser emitter(s), respectively to emit at least one first laser radiation according to a first predetermined power in the direction of a first target area of the part or of said part element and to emit a second laser radiation according to a second predetermined power in the direction of a second target area of the part or of said part element distinct from the first target area, the second predetermined power being different from the first predetermined power.

Such a device can allow obtaining an accurately controlled heating temperature gradient or carrying out a substantially uniform heating of a part or of a part element without necessarily replicating the geometry of this part.

Such a device can be used to perform a "pre-heating", in other words a heat treatment prior to a given material addition step during an additive manufacturing, in particular by a powder bed melting technique or by LMD (standing for "Laser Metal Deposition").

Such a heating device can also be used to carry out a heat treatment following a given material addition step, during an additive manufacturing, in particular by a powder bed melting technique or by LMD.

In both cases, the heating is carried out at a temperature lower than the melting temperature of said given material or of said powder.

In particular, the considered part may be a metal and/or composite material part, in particular a part intended to be subjected to significant thermal and mechanical stresses.

The laser heating device is particularly suitable for making or repairing turbine blade elements for an aircraft engine.

The heating device is provided with a module for controlling said laser emitter elements configured to:

acquire thermal profile data associating geometric and/or position data of target areas of said part with respective heating temperature values, modulate the emission power of said one or more laser emitter(s) of said laser source according to said thermal profile data.

According to a possible embodiment, the first laser radiation according to said first power and said second laser radiation according to the second power can be emitted successively by the same laser emitter. Thus, a temporal control of heating can be implemented.

The first laser radiation according to said first power and said second laser radiation according to the second power may originate respectively and concomitantly from a first laser emitter and from a second laser emitter. Thus, a spatial control of the heating can also be implemented.

According to a possible implementation, the laser source may be formed of one or more first emitter(s) belonging to a first support as well as one or more second emitter(s) belonging to a second support distinct from the first support, a space between said first support and said second support being provided for to accommodate said part.

According to another possible implementation, the laser source includes laser emitters distributed over an area of a support forming a closed contour, in particular circular or ovoid, around a cavity in which the part can be disposed.

Advantageously, the laser emitters are VCSEL-type laser diodes.

Advantageously, a heating device as defined hereinabove can be associated with a device for additive manufacturing by direct deposition of a material of the metal powder or molten metal wire type, advantageously of the LMD type, or integrated into a system for additive manufacturing, in particular by direct deposition of a material of the metal powder or molten metal wire type advantageously of the LMD type.

Typically, such a system is provided with at least one material dispenser member and another laser source distinct from said given laser source.

Advantageously, this system is also provided with control means for modulating the respective emission power of said one or more laser emitter(s) according to positioning data of said material dispenser member. According to a particular embodiment, these control means are integrated into the control module defined hereinabove.

A laser heating device as defined hereinabove can be used to implement different heat treatment steps to prepare the part for welding, or for a material addition, or for reinforcement, or to control a cooling, in particular after either one of the aforementioned steps.

According to another aspect, an embodiment of the present invention provides for the use of a laser heating device as defined hereinabove, for the repair or the manufacture of a blade element or of a blade of aircraft engine.

According to another aspect, an embodiment of the present invention provides a method for manufacturing or repairing at least one portion of a blade of an aircraft engine comprising one or more step(s) of additive manufacturing by laser-assisted powder spraying, in particular of the LMD type, at least one of said additive manufacturing steps being preceded or followed by a heating using a laser heating device as defined hereinabove.

Advantageously, the heat treatment is performed at a temperature lower than the melting temperature of said powder.

BRIEF DESCRIPTION OF THE DRAWINGS

The present invention will be better understood on the basis of the following description and from the appended drawings wherein:

FIGS. 1A and 1B serve to illustrate an induction heating device as implemented according to the prior art;

FIG. 2 serves to illustrate a laser heating device as implemented according to an embodiment of the present invention;

Identical, similar or equivalent portions of the different figures bear the same reference numerals so as to facilitate passage from one figure to another.

Figure 3:
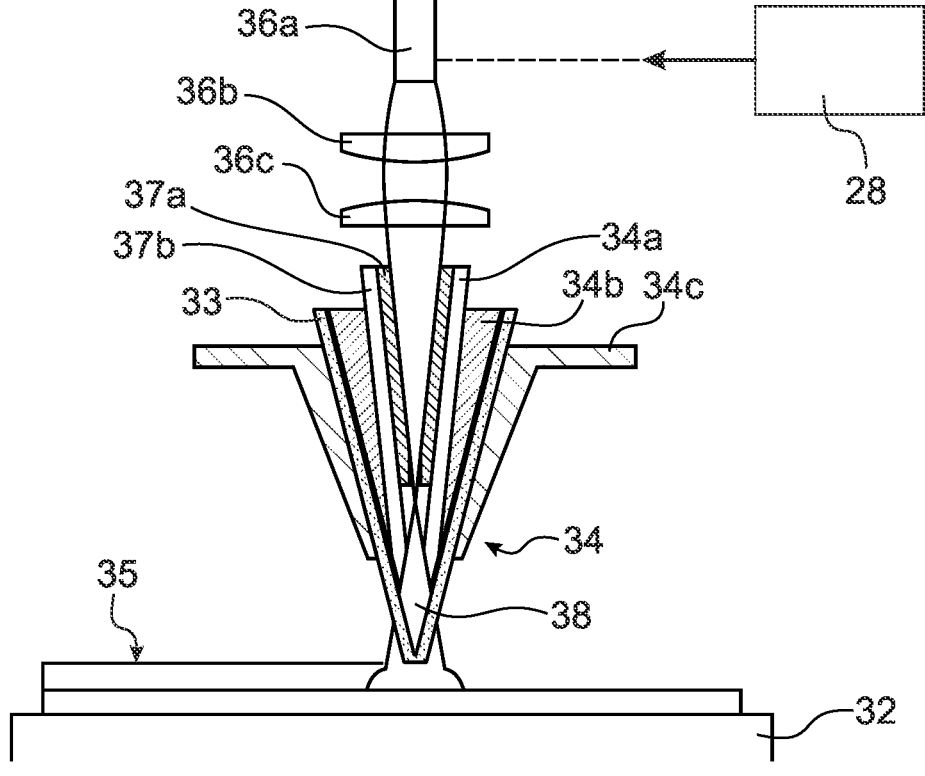
FIG. 3 serves to illustrate a LMD-type additive manufacturing device with which a laser heating device according to the invention can be associated or into which this heating device can be integrated.

The different portions represented in the figures are not necessarily according to a uniform scale, to make the figures more readable.

DETAILED DISCLOSURE OF PARTICULAR EMBODIMENTS

An embodiment of a laser heating device as implemented according to an embodiment of the present invention is schematically represented in FIG. 2.

Such a device is used in particular in the context of the manufacture or repair of a part 5, in particular a part based on a metal and/or composite material, and which may be intended to undergo significant thermal and mechanical stresses and/or may have a complex shape. In particular, the considered part 5 may be a blade element or a blade of a gas turbine intended to be subjected to high thermal and creep stresses.

The turbine blade that is manufactured or repaired may be made of a metal alloy such as a TiAl alloy or, according to another example, an alloy based on nickel and one or more of the following elements: Cr, Co, Mo, W, Al, Ti, Ta, Hf, Re, Ru.

According to other examples, part 5 can be made of a refractory steel superalloy or of a composite composed of a nickel-based superalloy reinforced with a low volume fraction (several percent) of fibres. Alternatively, the considered part 5 may be provided with a body made of a given material covered with one or more coating(s) of a material different from the given material, for example a metal body coated with a thermal barrier made of a ceramic material.

The laser heating device can be used during different heat treatment steps of a method for manufacturing a blade, and in particular heat treatment at a temperature lower than the melting temperature of the material(s) in presence. Thus, such a heating device can be used to carry out a pre-heating, in particular a heat treatment on a blank part or a part or a part element, prior to a step of adding material over this part or blank or element. In this case, the pre-heating heat treatment is carried out at a temperature lower than a melting temperature of a powder used afterwards to carry out the material addition typically by a LMD method.

Another example of use of the heating device to perform a quick annealing in preparation for welding generally performed at a temperature comprised between 700° C. and 900° C., for example in the range of 800° C.

The heating device is not necessarily used to perform pre-heating steps and can be used to carry out steps that follow a material addition step. For example, it is possible to use the heating device during a so-called "relief" annealing, typically performed at a temperature comprised between 600° C. and 1,000° C. Herein again, the annealing is typically performed at a temperature lower than the melting temperature of the material(s) in presence.

Another example of use of the heating device is annealing implemented during a cladding operation during which areas of a part that lacks material are rebuilt or to add material over this part. For example, it may be desired to clad a blade made of a monocrystalline nickel-based superalloy by providing a cladding microstructure having a crystalline orientation consistent with that of the blade.

The cladding operation may be performed by an additive manufacturing technique by powder bed melting, for example of the LMD type (standing for "Laser Metal Deposition"). An accurate control of the spatial temperature distribution that it is desired to impart on the part 5 can then be obtained using the laser heating device.

To heat the part 5 according to a predetermined thermal profile which can be adapted to the geometric shape of this part 5, the heating device is here provided with a laser source 11 with an adjustable power and in this example formed by a plurality of laser emitters $11_1, \ldots, 11_n$ distributed over a support 10.

For example, the laser emitters $11_1, \ldots, 11_n$ may laser diodes, in particular of the VCSEL type ("vertical-cavity surface-emitting laser") in other words semiconductor laser diodes emitting a laser ray perpendicular to the surface of an active semiconductor region. This region is associated with a laser resonator typically formed by Bragg mirrors parallel to said surface. In the context of the intended application, such types of emitters have the particular advantages of emitting a low divergence beam, of enabling a high integration density of emitters, of being able to be integrated in the form of several rows or matrices, of facilitating a spatial and temporal control of the amount of energy supplied to the part 5 or to target areas of the part 5 to be heated.

The number of emitters and their distribution density depends on the type of part to be pre-heated and the shaping system. According to a particular embodiment, the device may be provided with 1 to 20 groups of independent emitters vertically or horizontally, each group may be composed of 1 to several hundred emitters. Each emitter may be spaced apart from the next one by a distance for example in the range of 100 μm on the module.

A given laser emitter $11_i$ produces a radiation at a wavelength λa typically comprised between 650 nm and 1,300 nm, for example in the range of 800 to 1,000 nm. The power $P_i$ of the laser is individually adjustable and for example comprised between 100 W and 10 kW according to the heating temperature to which it is desired to subject a target area $6i$ of the part.

In the illustrated example, the laser emitters $11_1, \ldots, 11_n$ are disposed over a support 10 forming a closed contour. The laser emitters $11_1, \ldots, 11_n$ are herein in particular distributed around a cylindrical shaped surface defining a cavity 17 in which the part 5 is placed during heating. The heating device is also provided with an optical system 13 to direct the laser beams. For example, the optical system includes lenses distributed over the cylindrical surface and each facing one or more laser emitter(s).

Such a heating device may allow carrying out a uniform heating of the part 5 although the latter has a geometry different from that of all of the heating elements distributed around it.

For this purpose, through an individual power control of the laser emitters $11_1, \ldots, 11_n$, a first laser radiation emitter $11_1$ can emit a radiation according to a first predetermined power $P_1$ in the direction of a first target area $6_1$ of the part 5 located at a first distance $d_i$ from this emitter $11_1$ whereas another emitter emits radiation according to another power $P_5$ different from the first power $P_1$ in the direction of another target area $6_5$ of the part 5 located at a second distance $d_2$ of part the 5. The powers $P_1$, $P_5$ are adapted according to the positioning of the target areas $6_1$, $6_5$ with respect to the laser source, in other words according to the shape of the exposed object. In the illustrated example, the distance $d_1$ being smaller than the distance $d_5$, the power $P_5$ may for example be provided higher than the power $P_1$ to allow carrying out a uniform or substantially uniform heating between the target areas $6_1$, $6_5$ of the part 5.

With such a heating device, it is also possible to perform a non-uniform heating of the part 5 but with a controlled thermal gradient, for example by subjecting a localised area of the part 5 to a given heating temperature, whereas another area of the part is brought to a different temperature, or even is not exposed to a laser beam, an emitter located opposite this other area emitting no laser beam.

To enable the individual control of the power of the emitters $11_1, \ldots, 11_n$, the heating device is provided with or associated with a control module 28. Typically, this control module 28 is provided with a computer and/or a processor and/or at least one electronic circuit, for example an ASIC (standing for "Application-Specific Integrated Circuit") with hardware and/or software components allowing producing signals for controlling the emission and the power of the emitters $11_1, \ldots, 11_n$. In the case of VCSEL emitters, these signals act for example in particular on the respective potentials of the electrodes of the laser diodes.

The control module 28 may also be provided with or associated with at least one memory, allowing storing geometric data relating to the geometry of the part 5, and/or to positioning data of different target areas of the part 5 in a given frame. A 3-dimensional model of the part associated with structural data of its constituent material may also be used.

Typically, the geometric and/or positioning data of the part are respectively associated with heating temperature, and/or laser energy and/or laser power data. More particularly, based on thermal profile data associated with geometric data of the part 5 and/or positioning of the target areas of the part 5, the control module 28 can individually control the laser emitters $11_1, \ldots, 11_n$.

Besides an individual emission power control, an "ON/OFF" type control, so as to make one or more of said laser emitters active, i.e. so that each emits a laser radiation, whereas one or more other emitter(s) are made inactive, in other words do not emit any laser radiation, may be implemented.

A heating control carried out by such a device may be implemented using temperature measurement sensors such as a pyrometer or thermocouples or a thermal camera. A servo-control of the heating temperature by modulating the power of the laser diodes may for example be carried out in order to maintain a temperature in the part constant over time.

A particular application of a heating device with laser emitters as described before is its association with an additive manufacturing device or its integration into an additive manufacturing system, in particular a device or a system using the melting technique on a powder bed such as an LMD ("Laser Metal Deposition") device based on the principle of depositing a powder jet over a melting surface heated by a high-power laser.

Such devices may be provided with a dispenser member formed of a metal which makes the use of an induction heating device unsuitable. Indeed, the use of such a heating device could create parasitic eddy currents at the typically metal material dispenser member and disturb its operation by causing an untimely heat-up of this member.

FIG. 3 represents a particular additive manufacturing device using the LMD technique and which can be associated with a heating device according to the invention (not represented in this figure). A melting of projected powder is here implemented using a laser 38 to form or clad a blade element 35.

The operating parameters of the additive manufacturing device, in particular of the laser source 38, in particular its power throughout the process, can be modulated by means of an independent control unit. Alternatively, the same control module 28 as that of the previously-described laser heating device can be used.

The control unit or the control module 28 may also be configured to acquire positioning data from the material dispenser member and adapt the respective power of the laser emitters according to these positioning data. Positioning data of a support of the part may also be taken into account. In turn, such positioning data may originate from position and/or motion sensors.

In this example, the device for additive manufacturing by selective melting on a powder bed is designed to make the blade element 35 by deposition of material over a horizontal plate type support 32. The device is provided with a movable material dispenser member relative to the support 32 and carried for example by a robotic arm. The manufacturing device is connected to a metal powder supply and to a metal powder dispenser. The material dispenser member comprises a nozzle 34 for projecting the metal powder and at least one laser emitter 36 configured to emit a laser beam 38 through the nozzle 34. The powder is conveyed by the carrier gas and is projected in the form of a powder stream. For example, the powder comprises a nickel-based alloy.

The laser beam 38 can be conveyed up to the nozzle 34 through an optical path defined in the illustrated particular example by an optical fibre $36a$ and lenses, for example with a collimating lens $36b$ and a focusing lens $36c$. The beam 38 is intended to pass through an inner axial opening of the nozzle 34 and to be directed towards the support 32 over which the powder is projected. The laser beam 38 is emitted at a predetermined wavelength Ab and at a predetermined power so as to melt the projected powder. For example, the wavelength Ab is in the range of 1,064 nm. For example, the beam 38 is that of a YAG laser with a power for example comprised between 0.2 kW and 2 kW In the represented example, the nozzle 34 has a generally conical or frusto-conical shape, one end of which with a smaller diameter forms the powder outlet. In this example, the nozzle 34 comprises several coaxial cones 34a, 34b, 34c, here three in number, which are mounted one inside another.

An inner cone 34a defines with an intermediate cone 34b which surrounds it an inner annular passage for the ejection of a protective gas flow 37a around the beam 38. The passage is connected to means for conveying the protective gas from the aforementioned supply. Typically, the protective gas 37a is an inert gas such as Argon, Helium, or Nitrogen. The intermediate cone 34b defines with the outer cone 34c that surrounds it an outer annular passage for the ejection of a powder flow 33. The intermediate cone 34b defines with the inner cone 34c that surrounds it an annular passage for the passage of a shaping gas 37b.

The heat source generates on its way significant thermal gradients, for example in the range of 10,000-20,000 K/s which are likely to induce residual mechanical stresses. During the solidification and cooling, the material may shrink in the transverse, longitudinal directions and across the thickness. These shrinkages cause mechanical stresses which might be the source of transverse (related to the longitudinal shrinkage) or longitudinal (related to the transverse shrinkage) cracking. Upon passage of the laser beam 38 leading to the melting of the material, the local mechanical stresses depend on the thermal gradient as well as the clamping conditions of the element 35. In the case of a non-clamped element 35, the heating generates a local expansion of the upper portion which is likely to cause a concave curvature. Because of this curvature, the upper face is subjected to a tensile stress.

To overcome undesired stresses, it is possible to provide for subjecting the element 35 implemented using the aforementioned additive manufacturing device to a heat treatment step called "post-heating", in other words carried out following the material addition step. Thus, the element 35 is then subjected to a heat treatment with a controlled thermal gradient in order to limit the stresses in the material. For example, a post-heating type annealing may be carried out at a temperature comprised for example between 500° C. and 1,000° C.

Besides a heat treatment controlled during cooling of the element 35 or performed after addition of material, a laser heating device as implemented according to the present invention may also be used to carry out a pre-heating, in other words a step of heat treatment on a body or an element prior to the addition of material. For example, a preheating-type annealing may be carried out at a temperature comprised for example between 300° C. and 1,000° C.

The emission power of the laser source 38 of the previously-described device may be adapted according to positioning data of the part 35 in a given frame and/or data relating to its geometric shape.

Figure 4A:
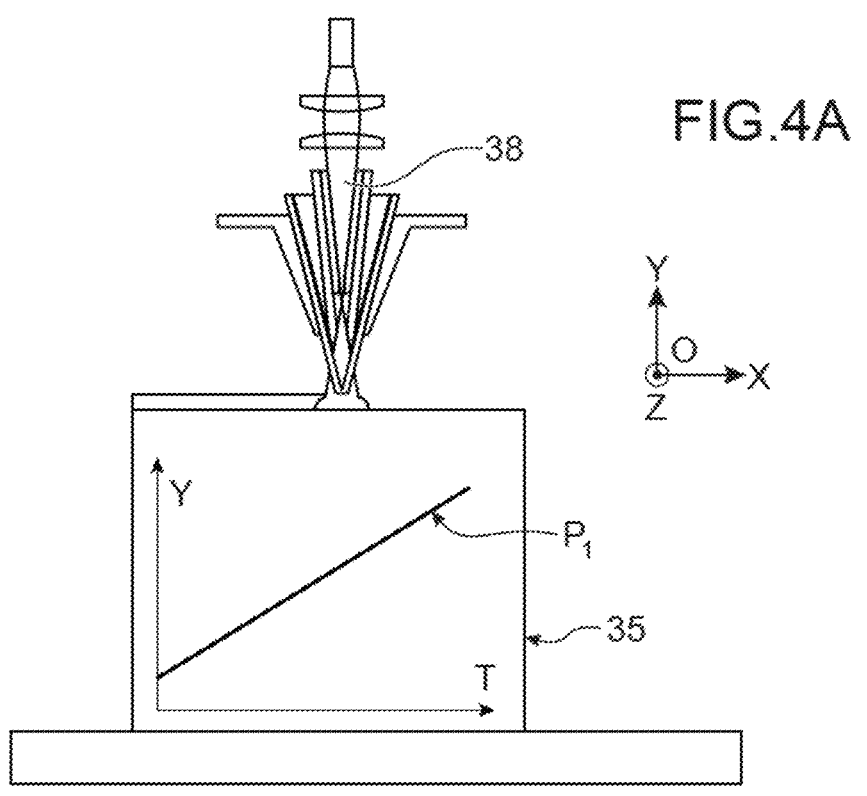
FIGS. 4A and 4B serve to illustrate different examples of thermal profiles as a function of coordinates of the part that a heating device according to the invention can implement.

In the particular example illustrated in FIG. 4A, the power of the laser source 38 of the additive manufacturing device is adapted according to a predetermined thermal profile $P_1$ recorded and used by the control module allowing modulating the power of the source laser 38. Here, the considered profile $P_1$ is a linear function which relates temperature data and positioning data, here relating to a height or thickness of the part 35 (dimension measured parallel to an axis Y of a frame [O; X; Y; Z] with respect to a reference frame.

According to the profile $P_1$, the power of the laser 38 is increased as the thickness of the element 35 is increased.

Figure 4B:
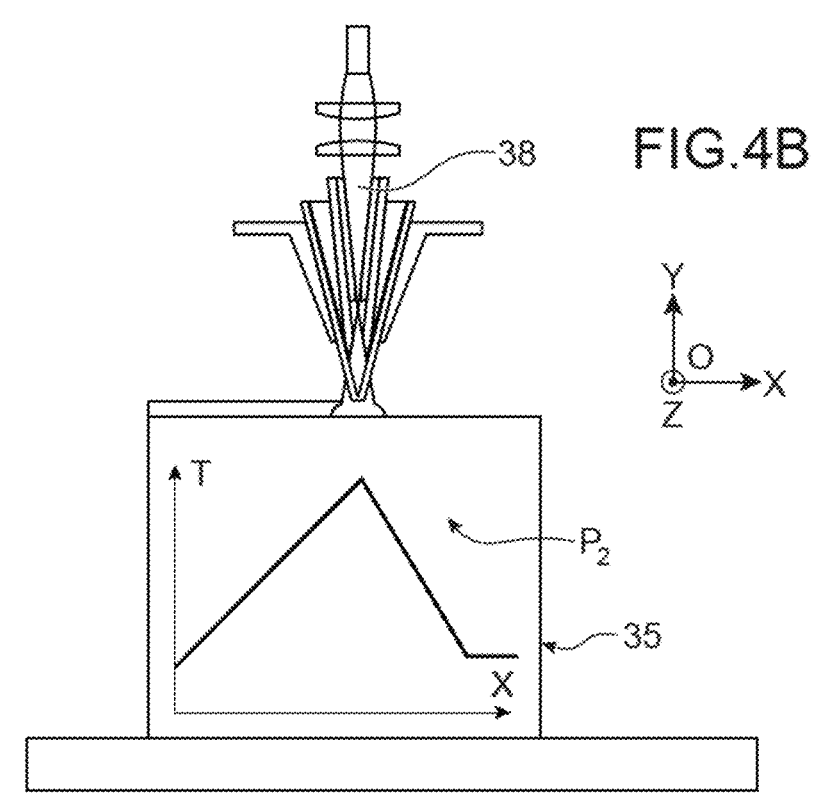

Another example of a thermal profile $P_2$ is given in FIG. 4B. The thermal profile $P_2$, different from P1, this time relates temperature data and a dimension X, for example a lateral dimension of the part 35. According to the profile $P_2$, the power of the laser 38 is increased when approaching a central region of the part and decreased when approaching lateral areas.

Such a power modulation as a function of a thermal profile can also be implemented by the laser heating device as described before, in particular when it is associated with or provided with a control module as described before. Other profiles, for example 2D or 3D, relating heating temperatures to 2D or 3D coordinates can also be used by the power control module. Non-linear thermal profiles following more complex distributions may also be provided for.

A laser heating device also allows heating regions with very diverse respective shapes and distributions.

Figures 5A, 5B, 5C, 5D:
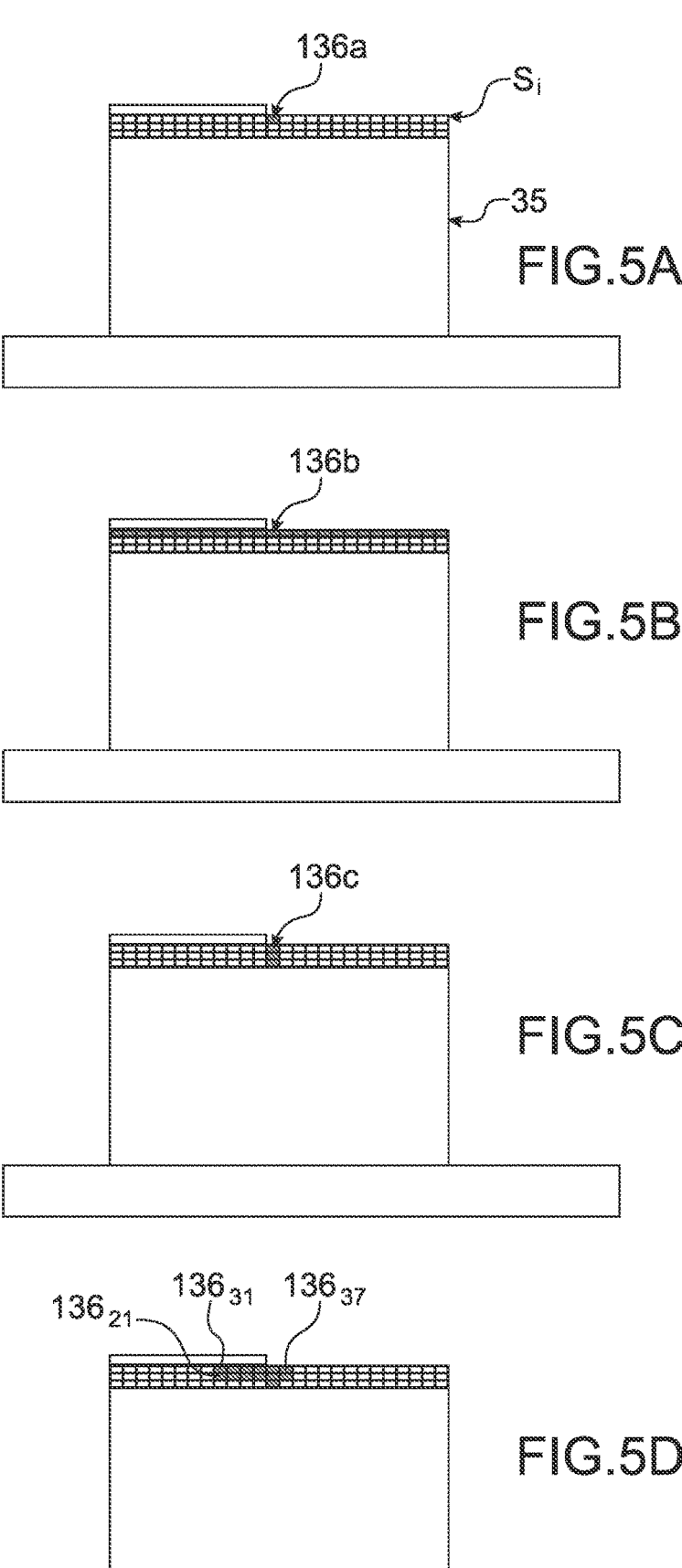
FIGS. 5A, 5B, 5C and 5D serve to illustrate different shapes of localised regions that can be heated by a laser heating device as implemented according to the invention.

In the example of FIG. 5A, the region 136a of the part 35 which is subjected to laser heat treatment corresponds for example to an elementary surface Si (cell) that a laser beam can illuminate when it is static.

In the example illustrated in FIG. 5B, a region 136b which extends over the entire width of the part 35 is subjected to a laser radiation of the same power, for example by scanning from the same laser source or by means of different laser emitters emitting simultaneously at the same power.

According to another example illustrated in FIG. 5C, a region 136c which extends over a given height of the part 35 is subjected to a laser radiation of the same power.

Another example of a heating profile given in FIG. 5D provides for example for subjecting regions $136_{21}$, $136_{31}$ located at different thicknesses to the same laser power whereas regions $136_{31}$, $136_{37}$ located at the same thickness but at different levels receive different respective laser powers.

Figure 6:
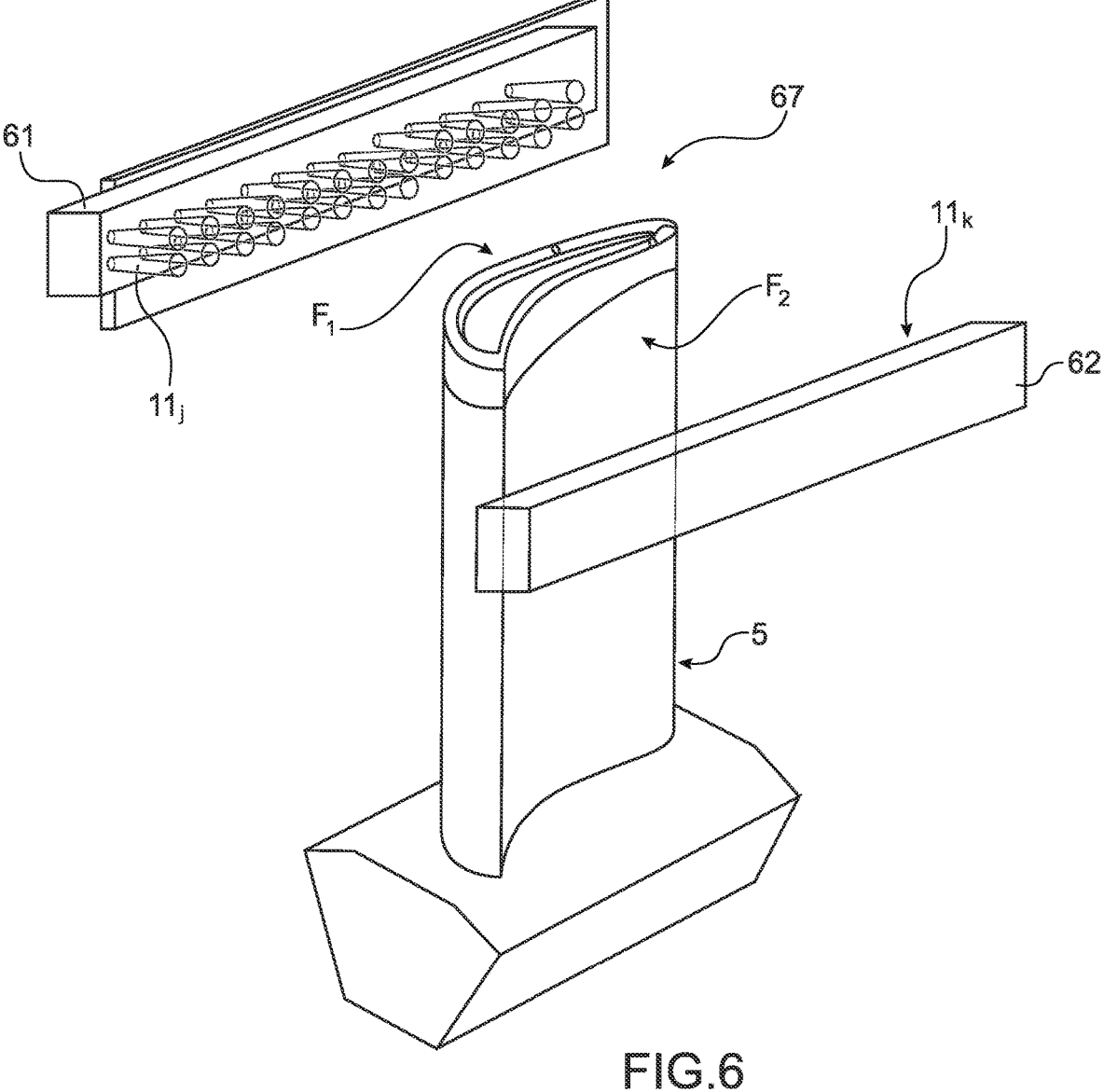
FIG. 6 serves to illustrate a particular example of a support of laser emitters in a laser heating device as implemented according to the present invention.

Different shapes may be provided for the support structure of the laser emitter elements. In the particular embodiment given in FIG. 6, the heating device includes one or more first emitter(s) $11_j$ distributed over a first support 61, for example like a parallelepiped bar, whereas one or more second emitter(s) $11_k$ is or are integrated into a second support 62 like a parallelepiped bar 62. A space 67 or a cavity 67 is provided for between the two supports 61, 62 to accommodate the part 5 to be heated.

Thus, it is possible to heat target areas located on opposite faces F1, F2 of the same part 5 and possibly carry out distinct heating profiles from one face to another, according to the respective powers of the emitters $11_j$ and $11_k$ and/or the number of emitters activated and emitting from one support to another. For example, the emitters $11j$ of the first support emit at a power different from that of the emitters $11_k$ of the second support. Alternatively, the emitters $11_j$ of the first support 61 emit according to respective powers according to a first power distribution whereas the emitters $11_k$ of the second support 62 emit according to respective powers according to a second power distribution different from the first distribution, in particular when the two faces F1, F2 have different geometric profiles.

Figure 7:
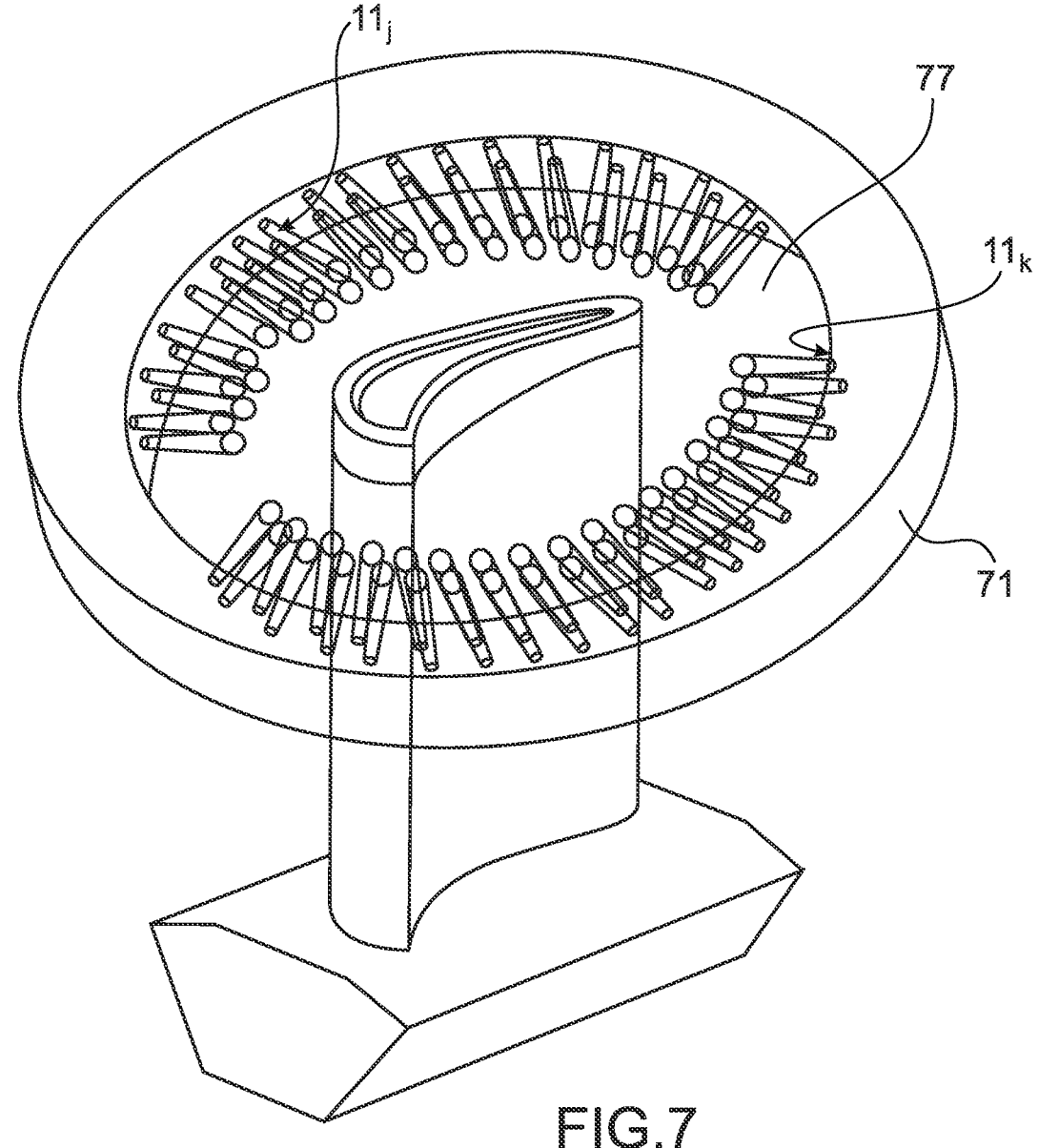
FIG. 7 serves to illustrate another particular example of a support of laser emitters in a laser heating device as implemented according to the present invention.

In the particular embodiment given in FIG. 7, laser emitters $11_j$, $11_k$ distributed over an area of a support 71 forming a closed contour, in particular circular or ovoid, can emit simultaneously or consecutively, at respective powers that are identical or else different according to the desired heating profile. Such a device can allow obtaining a more uniform heating distribution.

As indicated before, a heating device as implemented according to the invention is not reserved for heat treatment steps to carry out a welding or a material addition. It can also be used, for example, to carry out a heating during an element separation step.

The invention claimed is:

1. A laser heating device for heating a mechanical part or a part element, including a blade element or a blade of a turbine, according to a predetermined thermal profile, said heating device comprising:

a given laser source provided with plural laser emitters, respectively to emit at least one first laser radiation according to a first predetermined power in the direction of a first target area of the part or of said part element and to emit a second laser radiation according to a second predetermined power in the direction of a second target area of the part or of said part element distinct from the first target area, the second predetermined power being different from the first predetermined power, and a control module of said laser emitter elements, said control module being provided with a memory storing geometric data relating to a geometry of the part element and positioning data of different target areas of the part element, said control module being configured to:

produce thermal profile data associating said geometric and position data of target areas of said part element with respective heating temperature values or associating position data of target areas of said part with respective heating temperature values, modulate the respective emission power of said laser emitters of said laser source according to said thermal profile data, wherein the laser emitters of the laser source are arranged on a support defining a cavity in which the part can be placed, with the laser emitters distributed along a closed contour around the cavity.

2. The device according to claim 1, wherein said first laser radiation according to said first power and said second laser radiation according to said second power are emitted successively by the same laser emitter, or said first laser radiation according to said first power and said second laser radiation according to said second power originate respectively and concomitantly from a first laser emitter and from a second laser emitter.

3. The device according to claim 1, wherein said given laser source comprises at least one first emitter belonging to a first support and at least one second emitter belonging to a second support distinct from the first support, a space between said first support and said second support being provided to accommodate said part.

4. The device according to claim 1, wherein the laser emitters are laser diodes emitting a laser ray perpendicular to the surface of an active semiconductor region called VCSEL (vertical-cavity surface-emitting laser) laser diodes.

5. The device according to claim 1, wherein said memory stores a three-dimensional model of the part element associated with structural data of its constituent material.

6. A system for additive manufacturing by direct deposition of material of the metal powder or molten metal wire type comprising a laser heating device according to claim 1.

7. The additive manufacturing system according to claim 6, provided with a material dispenser member and with another laser source distinct from said given laser source, the heating device being configured so that said laser emitters emit at a specific power so as to achieve heating at a temperature lower than the melting temperature of said material.

8. A method for manufacturing or repairing a blade or of a blade element of an aircraft engine comprising:

additive manufacturing by laser-assisted powder spraying being preceded or followed by a heat treatment using a laser heating device according to claim 1.

9. The method according to claim 8, wherein said heat treatment is performed at a temperature lower than the melting temperature of said powder.

* * * * *